July 21, 1959  H. L. MUELLER  2,895,526
RIM FOR TUBELESS TIRE
Filed May 23, 1955

INVENTOR.
HOMER L. MUELLER
BY
Tennes J. Erstad
ATTORNEY

United States Patent Office 2,895,526
Patented July 21, 1959

2,895,526

RIM FOR TUBELESS TIRE

Homer L. Mueller, Rocky River, Ohio, assignor to American Machine & Foundry Company, a corporation of New Jersey Application May 23, 1955, Serial No. 510,137

7 Claims. (Cl. 152—410)

This invention relates to rim assemblies for pneumatic tubeless tires.

One of the problems in using tubeless tires more extensively, especially for trucks, has been the problem of loss of pressure in the tire, particularly in tubeless tires that are subjected to the rough usage that is encountered in tires employed on trucks.

It is an object of this invention to provide a rim assembly that is particularly well-suited for use with a tubeless tire which will effectively prevent the loss of air in the tubeless tire even when used on trucks.

A further object is to provide a sealing gasket wherein a split side ring will be caused to pivot and twist on the rim base as the amount of air pressure in the truck tire is increased to thereby exert a squeezing action on the gasket to squeeze the sealing ring tightly in the gutter up against the side ring.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
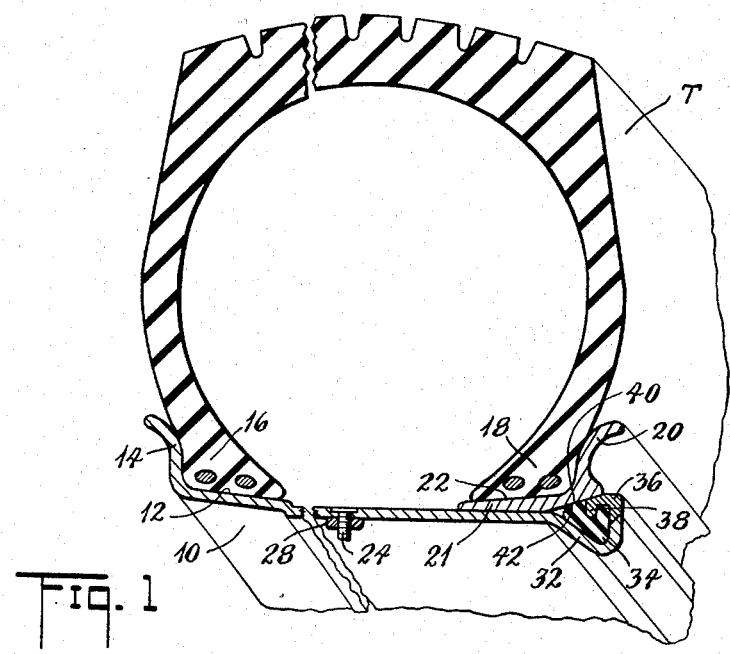
Figure 1 is a fragmentary sectional perspective view of a tubeless pneumatic tire and a rim assembly incorporating the features of the present invention.
Figure 2:
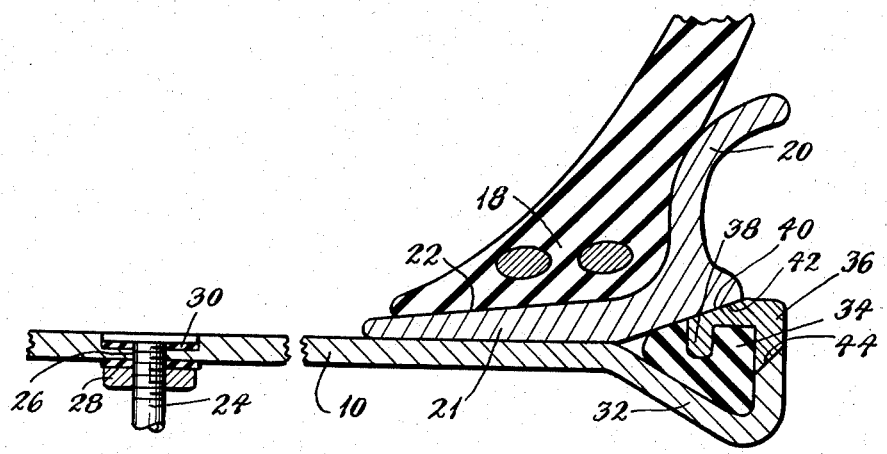
Figure 2 is a fragmentary sectional detail on a larger scale of the novel features of the rim assembly shown in Figure 1.

Referring at the drawing I have shown an endless flat rim base 10 having an inclined, tapered bead seat 12 and a flange 14 conforming to the configuration of a tubeless tire bead 16. The tubeless tire bead has a suitable air sealing substance or construction which prevents air from escaping between the surfaces of the bead 16 and seat 12 and the flange 14. The opposite bead of the tubeless tire T is supported by a side ring 21 having a flange 20 and a tapered tire beat seat 22 both of which conform to the configuration of the bead 18. By means of a suitable air sealing construction formed on the bead 18 an airtight seal between the bead 18 and the seat 22 and the flange 20 is effected when the tubeless tire T is inflated through the valve stem 24.

A conventional valve stem 24 is mounted in a suitable hole 26 formed in the central portion of the rim base 10 and is held securely to the rim base 10 by means of a locking nut 28 and an air sealing gasket 30.

The surface of the bead seat 22, which is next to the rim base 10 has a diameter which is slightly larger than the flat portion of the rim base 10 so that it can easily move in and out on the rim base.

The other side of the rim base has a gutter channel 32 formed thereon which is adapted to receive an endless air sealing gasket 34 made of rubber or other suitable sealing material and a split locking ring 36 which is formed with a downwardly extending flange 38 which engages with the sealing gasket 34 to form an airtight seal therewith.

The split locking ring 36 is seated on top of the tapered edge 44 of the gutter 32 and is formed with a tapered surface 40 against which the side ring 21 engages with its corresponding tapered surface 42 when the tubeless tire is inflated. The inflation of the tubeless tire causes the side ring 21 to move outwardly on the rim base 10 so that the tapered surface 42 of the side ring 21 engages with the tapered surface 40 of the split ring 36, thereby exerting a downward tilting action on the flange 38 causing the split locking ring to pivot on the tapared top of the outer edge 44 of the gutter 32.

When the split locking ring 36 is pivoted in this manner the flange 38 squeezes into the sealing ring 34 which may be made of rubber or other suitable gasket or air sealing material. This causes said sealing material to fill out the gutter corners and squeeze against the side ring 21, thus forming an airtight seal which prevents the escape of air from the inflated tire.

By the arrangement I have provided, two distinct squeezing actions are effected on the endless sealing ring 34. As the side ring 21 moves outwardly, it engages with the sealing ring 34, crowding it against the gutter 32 and the downwardly extending flange 38 of the split locking ring 36 and against the tapered surface 42 of the side ring 21. When the tapered edge 42 engages with the tapered edge 40 the split locking ring 36 it pivots downwardly into the endless rubber ring 34. A further squeezing action is exerted on the gasket 34 causing it to squeeze outwardly against all of the air sealing surfaces of the gutter 32, the side ring 21, and the split locking ring 36.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A rim assembly for tubeless tires comprising a rim base having a flange and bead seat formed on one side of said rim base conforming to the configuration of the bead of a tubeless tire for effecting an air seal between the bead and the flange and seat, a side ring having a flange and a bead seat conforming to the configuration of the opposite bead of the tubeless tire to effect an air seal between the bead and the seat and flange of said side ring, a gutter formed on the opposite side of said rim base and extending around the base over which said side ring is slid on to said base, an endless sealing ring mounted in said gutter, a split locking ring mounted so that one beveled edge pivots on the outer edge of said gutter, said split locking ring having a downwardly extending flange extending into said sealing ring, a tapered surface formed on said side ring and engaging one side of said split locking ring to exert a twisting action thereon to force the downwardly extending flange of said locking ring into said rubber sealing ring to form an air seal between the side ring, the gutter and the locking ring.

2. A rim assembly for tubeless tires comprising a rim base, a flange and a bead seat formed on one side of said rim base conforming to the configuration of a tire bead of a tubeless tire to effect an air seal between the bead and seat and flange, a gutter extending around and below the surface of the opposite side of said rim base, a side ring slideably mounted over said gutter on the said opposite side of said rim base to engage the opposite bead of said tubeless tire, said side ring having a flange and a seat conforming to the configuration of the bead of a tubeless tire to effect an air seal with the same, an endless rubber sealing ring positioned in said gutter, a split locking ring mounted to pivot on the outer edge of said gutter, a downwardly extending flange formed on said split locking ring, and engaging into said sealing ring, said side ring having a tapered cam surface engaging said split locking ring to cause a downward turning pressure to be exerted on said locking ring when said side ring is pushed outwardly when the tubeless tire is inflated to cause said downwardly extending flange to exert a squeezing action on said rubber sealing ring to form an air seal between the side ring the locking ring and the gutter.

3. A rim assembly for tubeless tires comprising a rim base, a flange and bead seat formed on one side of said rim base and conforming to the configuration of one bead of the tubeless tire so as to form an airtight seal with the bead, a depressed gutter channel formed on the other side of said rim base, a side ring having a flange and a bead seat conforming to the bead of a tubeless tire to form an airtight seal with the bead, said ring having a diameter enabling it to slide over the gutter onto said rim base, an endless sealing gasket mounted in said gutter and shaped to engage with the sides of said gutter and the underside of said side ring when the side ring is moved outwardly when the tubeless tire is inflated, a split locking ring so shaped that it has two downwardly extending flanges, one of which engages with the outer edge of the gutter formed on said rim base and the other flange extending downwardly into the endless sealing gasket, said side ring having a tapered camming surface formed thereon for engaging with said split locking ring to pivot the same about the said gutter edge to squeeze the said other flange downwardly into the endless sealing gasket to force the sealing gasket tightly against the gutter surfaces and the side ring to form an air seal.

4. A rim assembly for tubeless tires comprising a rim base, a flange extending around one side of said rim base and having a configuration conforming to the side of a tubeless tire bead, an endless side ring having a flange and being of a diameter enabling it to be slideably mounted over the other side of said rim base to engage with the opposite bead of a tubeless tire, said side ring having a camming surface formed on the side of said flange which is opposite to the portion of the side ring that engages with said opposite bead of the tire, a gutter formed on the side of said rim base which is opposite to the side having a flange formed thereon, an endless sealing gasket mounted in and around said gutter to be engaged by said side ring, a split locking ring mounted on said gutter to limit the outward movement of said side ring, said split locking ring being pivotally supported on the outer edge of said gutter so that when the side ring is moved outwardly by the inflation of said tubeless tire, it will cause the cam surface of the side ring to engage with the split locking ring, and pivot the split locking ring about said outer gutter edge to push one surface of said split locking ring inwardly into engagement with the endless sealing ring to effect an air seal between the split locking ring, the gutter and the side ring.

5. A rim assembly for a tubeless tire comprising a rim base, a flange formed on one side of said rim base for engaging with the bead of a tubeless tire, a gutter formed around the opposite side of said rim base, a side ring slideably mounted on said rim base for engaging with the other bead of a tubeless tire, an endless sealing ring mounted in said gutter and positioned between said side ring and said gutter, and a split locking ring pivotally mounted on said gutter and having an inner edge engaging with the rubber sealing ring, said side ring having a tapered camming portion for engaging with said split locking ring to cause the split locking ring to pivot relative to the gutter and thereby twist the inner edge into the gutter into compressing action with said endless sealing ring to effect an air seal between split locking ring, the gutter and the side ring.

6. A rim assembly for tubeless tires comprising a rim base, a flange formed along one side of said rim base for supporting the bead of a tubeless tire, a gutter positioned around the opposite side of said rim base, a side ring having a diameter enabling it to be slideably mounted on said rim base and movable over said gutter, said side ring having a flange conforming to the configuration of the opposite bead of a tubeless tire, an endless sealing ring mounted in and around said gutter, a split locking ring pivotally seated on the outer edge of said gutter, and a cam surface formed on said side ring for engaging with and imparting a twist to said endless locking ring to force the inner edge into the sealing ring when brought into engagement therewith by the inflation of a pneumatic tire to cause the endless side ring to be pushed toward the endless sealing ring to cause an air seal to be effected between the locking ring, the side ring and the gutter.

7. A rim assembly for tubeless tires comprising a rim base, a flange formed along the edge of one side of said rim base, for engaging with the bead of a tubeless tire, a gutter extending around and below the surface of the opposite side of said rim base, a side ring slideably mounted on said rim base, a split locking ring having an outer edge pivotally engaging with the edge of said gutter, an endless sealing ring positioned between said gutter, said side ring and said locking ring, and a cam surface formed on said side ring to engage with said locking ring to pivot the outer edge of the locking ring on said gutter to cause the inner edge of the locking ring to be pushed into the sealing ring when said tubeless tire is inflated to effect an air seal between the locking ring, the side ring and the gutter.

References Cited in the file of this patent

UNITED STATES PATENTS 2,685,907    Waddell _____ Aug. 10, 1954

FOREIGN PATENTS 1,080,891    France _____ June 2, 1954
   (Corresponding Great Britain Patent 725,767,
            Mar. 9, 1955)
1,097,353    France _____ Feb. 16, 1955
   (Corresponding Great Britain Patent 754,719,
            Aug. 8, 1956)